(12) United States Patent
Camuffo et al.

(10) Patent No.: US 8,554,143 B2
(45) Date of Patent: Oct. 8, 2013

(54) METHOD FOR ESTABLISHING A WIRELESS COMMUNICATION LINK

(75) Inventors: Andrea Camuffo, München (DE);
Daneila Raddino, München (DE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 151 days.

(21) Appl. No.: 10/547,814

(22) PCT Filed: Jan. 22, 2004

(86) PCT No.: PCT/EP2004/000516
§ 371 (c)(1),
(2), (4) Date: Oct. 4, 2006

(87) PCT Pub. No.: WO2004/080003
PCT Pub. Date: Sep. 16, 2004

(65) Prior Publication Data
US 2007/0037517 A1 Feb. 15, 2007

(30) Foreign Application Priority Data

Mar. 3, 2003 (EP) .................................... 03004670

(51) Int. Cl.
*H04B 7/00* (2006.01)
(52) U.S. Cl.
USPC ..... 455/41.3; 455/41.1; 455/41.2; 455/553.1; 455/552.1
(58) Field of Classification Search
USPC ................. 455/41.1, 41.2, 41.3, 552.1, 553.1
See application file for complete search history.

(56) References Cited

U.S. PATENT DOCUMENTS

| | | | | |
|---|---|---|---|---|
| 6,604,140 B1 * | 8/2003 | Beck et al. | ..................... | 709/226 |
| 6,775,258 B1 * | 8/2004 | van Valkenburg et al. | ..... | 370/338 |
| 6,879,810 B2 * | 4/2005 | Bouet | .......................... | 455/41.2 |
| 6,901,261 B2 * | 5/2005 | Banatre et al. | ............. | 455/456.1 |
| 7,116,975 B1 * | 10/2006 | Link et al. | ..................... | 455/417 |

(Continued)

FOREIGN PATENT DOCUMENTS

| | | |
|---|---|---|
| DE | 197 04 907 | 7/1997 |
| DE | 199 19 513 | 11/2000 |

(Continued)

OTHER PUBLICATIONS

International Preliminary Examination Report for PCT/EP04/000516.

(Continued)

*Primary Examiner* — Lester Kincaid
*Assistant Examiner* — Mehmood B Khan
(74) *Attorney, Agent, or Firm* — Myers Bigel Sibley & Sajovec

(57) ABSTRACT

A wireless communication link between two communication devices is established. A communication signal for contacting a second communication device is emitted from a first communication device. The communication signal is a first type of wireless data communication. Communications that are configured to transmit and receive data according to a second type of data communication are activated in the first communication device. Upon receipt of the communication signal, communications that are able to transmit and receive data according to the second type of data communication are activated in the second communication device, and the communication link according to the second type of data communication is established.

25 Claims, 3 Drawing Sheets

(56) References Cited

U.S. PATENT DOCUMENTS

| | | | |
|---|---|---|---|
| 7,239,845 B2 * | 7/2007 | Ollis et al. | 455/41.2 |
| 7,409,231 B2 * | 8/2008 | Oba et al. | 455/566 |
| 7,466,987 B2 * | 12/2008 | Kinnunen et al. | 455/456.3 |
| 7,496,369 B2 * | 2/2009 | Takasaki | 455/456.2 |
| 7,590,086 B2 * | 9/2009 | Olkkonen et al. | 370/328 |
| 2002/0052181 A1 * | 5/2002 | Tsai et al. | 455/41 |
| 2002/0164953 A1 * | 11/2002 | Curtis | 455/41 |
| 2002/0177411 A1 * | 11/2002 | Yajima et al. | 455/41 |
| 2003/0007641 A1 | 1/2003 | Kinoshita | |
| 2003/0114107 A1 * | 6/2003 | Aoyagi | 455/41 |
| 2003/0125074 A1 * | 7/2003 | Tanada et al. | 455/41 |
| 2003/0182441 A1 * | 9/2003 | Andrew et al. | 709/237 |
| 2003/0224840 A1 * | 12/2003 | Frank et al. | 455/575.9 |
| 2004/0137967 A1 * | 7/2004 | Bodley | 455/575.2 |
| 2004/0176118 A1 * | 9/2004 | Strittmatter et al. | 455/500 |
| 2004/0203698 A1 * | 10/2004 | Comp | 455/421 |
| 2005/0159107 A1 * | 7/2005 | Mauney et al. | 455/41.2 |
| 2005/0181725 A1 * | 8/2005 | Dabak et al. | 455/41.2 |
| 2007/0010285 A1 * | 1/2007 | Schmidt | 455/553.1 |
| 2009/0156125 A1 * | 6/2009 | Himmelstein | 455/41.2 |

FOREIGN PATENT DOCUMENTS

| | | | |
|---|---|---|---|
| EP | 1 274 194 | | 1/2003 |
| EP | 1274194 | * | 1/2003 |
| EP | 1 324 550 | | 7/2003 |
| EP | 1324550 A2 | | 7/2003 |
| JP | 08-294168 | | 11/1996 |
| KR | 10-2002-0044892 | | 6/2002 |
| KR | 10-2002-0074313 | | 9/2002 |
| WO | 98/35515 | | 8/1998 |
| WO | 01/93614 | | 12/2001 |
| WO | WO 01/93614 | * | 12/2001 |
| WO | WO 01/93614 A2 | | 12/2001 |

OTHER PUBLICATIONS

International Search Report and Written Opinion for PCT/EP04/000516.

Japanese Office Action mailed Jun. 19, 2009, Japanese Patent Application No. 2006-504390.

* cited by examiner

METHOD FOR ESTABLISHING A WIRELESS COMMUNICATION LINK

RELATED APPLICATIONS

The present application is a 35 U.S.C. §371 national phase application of PCT International Application No. PCT/EP04/000516, having an international filing date of Jan. 22, 2004 and claiming priority to European Patent Application No. 03004670.0, filed Mar. 3, 2003, the disclosure of which is incorporated herein by reference in its entirety. The above PCT International Application was published in the English language and has International Publication No. WO 04/080003.

The present invention relates to a method for establishing a wireless communication link between two communication devices. In particular, the invention relates to a method for establishing a bluetooth audio link between two mobile terminals of a wireless cellular communication system, e.g. the GSM or the UMTS system. The mobile terminals are e.g. mobile cell phones, PDAs or the like.

There are a lot of different ways for connecting electronic devices in order to wirelessly exchange communication data. Nowadays, GSM networks are widely used for audio communication between at least one mobile terminal and another communication device. In future, UMTS networks will be available which allow a significantly higher rate of data transfer.

One of the most interesting technologies for wireless data communication is the recently developed so-called bluetooth technology. Bluetooth is an international standard which has been developed by a group of electronics manufacturers that allows any sort of electronic equipment—e.g. computers, cellular phones, keyboards or headphones—to establish its own wireless data connection. It is an universal radio interface using the 2.45 GHz frequency band that has been set aside by an international agreement for the use of industrial, scientific and medical devices (ISM).

One of the possibilities bluetooth offers, is that two mobile terminals can connect to each other and use this communication link to carry audio information back and forward, thus enabling them to work as two-way radios. Since such a bluetooth link does not require a communication network such as a GSM network, data communication using the bluetooth technology would be significantly cheaper than using a mobile telephone network.

However, the establishment of a bluetooth link requires the called communication device to be in the so-called Discoverable/Connectable mode which is a state wherein the communication device is able to receive signals from other bluetooth devices. Since the communication device does not know when a communication link according to the bluetooth standard is to be established, it has to stay permanently in the Discoverable/Connectable mode which might result in significant impairment of the standby time of portable communication devices. Furthermore, leaving the communication device permanently in the Discoverable/Connectable mode is not recommended due to security reasons.

U.S. patent application Ser. No. 2002/0094801 A1 discloses a method of operating a telecommunication system in which a mobile communication device which is sending and receiving GSM communication data, upon receiving a bluetooth signal from a fixed station, answers the bluetooth signal by transmitting also bluetooth signals to the fixed station. This method allows to change from GSM communication to bluetooth communication to the fixed station provided that a bluetooth link was successfully established. However, in this method the fixed station permanently transmits bluetooth signals and the portable communication device is permanently in the Discoverable/Connectable mode.

It is therefore an object of the present invention to provide a method for establishing a wireless communication link—preferably a bluetooth link—that eliminates the above-described problems.

According to the present invention, a method for establishing a wireless communication link between two communication devices is provided, said method comprising the steps of a) emitting from a first communication device a communication signal for contacting a second communication device, said communication signal being of a first type of wireless data communication, b) activating in said first communication device communication means which are able to transmit and receive data according to a second type of data communication, c) activating in said second communication device upon receipt of said communication signal communication means which are also able to transmit and receive data according to said second type of data communication and d) establishing the communication link according to said second type of data communication between the communication means of the two communication devices.

In a preferred embodiment of the present invention, said first communication signal is a signal of a wireless cellular communication system, e.g. a GSM signal and the second type of data communication is a bluetooth link.

With the method according to the present invention, the establishment of the desired communication link according to the second type of data communication, e.g. the bluetooth link, is triggered by the communication link according to the first type of data communication, e.g. the link over the GSM network. Therefore, the establishment of the desired bluetooth link is basically handled like a typical GSM call without the need of keeping the circuitry for the bluetooth communication permanently activated. In other words, the communication means for the bluetooth communication are only activated for the time for which a bluetooth communication is desired. Since the energy for the bluetooth communication is restricted to a minimum, the standby time of portable communication devices can be significantly extended.

According to a preferred embodiment of the invention, the first communication signal for contacting the second communication device is refused by the second communication device in case the desired communication link according to the second type of data communication was successfully established. However, if an establishment of the second communication link—e.g. due to too large distances between the two communication devices—was not possible, the communication between the two devices will be continued via the first communication link. The circuitry for the second type of the data communication is then shut down in order to save energy.

Preferably, the type of communication link which has been established between the two communication devices is displayed on the two devices.

The establishment of the desired second type of communication link can be accelerated if identification information for contacting the other communication device via this second type of data communication is available. Therefore, in a preferred embodiment of the invention, each communication device comprises storing means for storing such identification information. According to another embodiment of the present invention, the required identification information is transmitted via the first communication signal when contacting the other communication device.

The present invention also relates to a wireless communication device which comprises means for emitting and receiving communication signals according to a first type of data communication and communication means for emitting and receiving communication signals according to a second type of data communication. In order to establish a communication link according to said second type of data communication with another communication device, controlling means are provided which automatically activate the communication means if a communication signal according to the first type of data communication is emitted from or received by the communication device. The present invention further relates to a wireless communication system which comprises at least two of such communication devices.

Further advantages, features and details of the present invention will become apparent from the following description of preferred embodiments with reference to the drawings.

Figure 1:
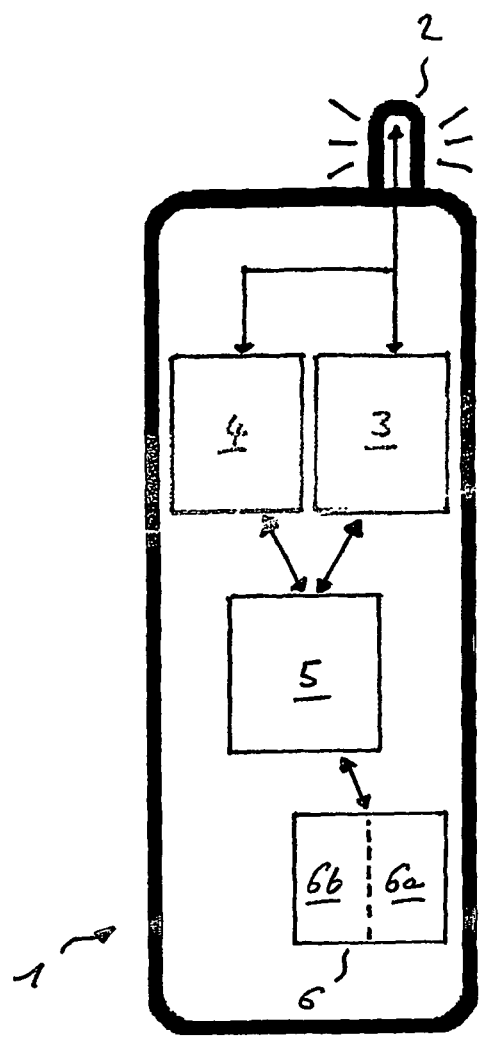
FIG. 1 is a schematic view of a wireless communication device in accordance with the present invention.

The wireless communication device shown in FIG. 1 is a mobile terminal or portable telephone 1 for a wireless cellular communication system, e.g. the GSM or UMTS system. Only the components which are relevant in respect to the present invention are described.

The portable telephone 1 comprises first an antenna 2 for transmitting and receiving wireless communication signals. According to the present invention, the portable telephone 1 is able to transmit and receive communication signals of two different types of data communication. Therefore, the portable telephone 1 comprises first communication means 3 for emitting and receiving communication signals according to a first type of data communication and second communication means 4 for emitting and receiving communication signals according to a second type of data communication. Both communication means 3 and 4 are connected to the antenna 2 in order to exchange communication signals provided a respective communication link has been established. Alternatively, each of the communication means 3 and 4 can be connected to a respective antenna, so that two antennas are provided.

The first and second communication means 3 and 4 are further connected to controlling means 5 which activate or deactivate the communication means 3, 4 depending on the kind of communication link which has to be established. Said controlling means 5 are further connected to storing means 6 in which identification information for contacting other communication devices are stored.

Preferably, the information contained in the storing means 6 comprises identification information for contacting other devices via the first communication means 3 as well as via the second communication means 4. Therefore, as shown in FIG. 1 the storing means 6 are divided in two memories 6a, 6b wherein memory 6a contains identification information for contacting other communication devices via the first communication means 3 and the second memory 6b comprises identification information for the second communication means 4. In a portable telephone as shown in FIG. 1, memory 6a is the typical phone book. Preferably, each information stored in memory 6a is assigned to a second information stored in memory 6b. Therefore, the storing means 6 comprise for each communication device to be contacted identification information in respect to the first type of data communication as well as the second type of data communication.

Figure 2:
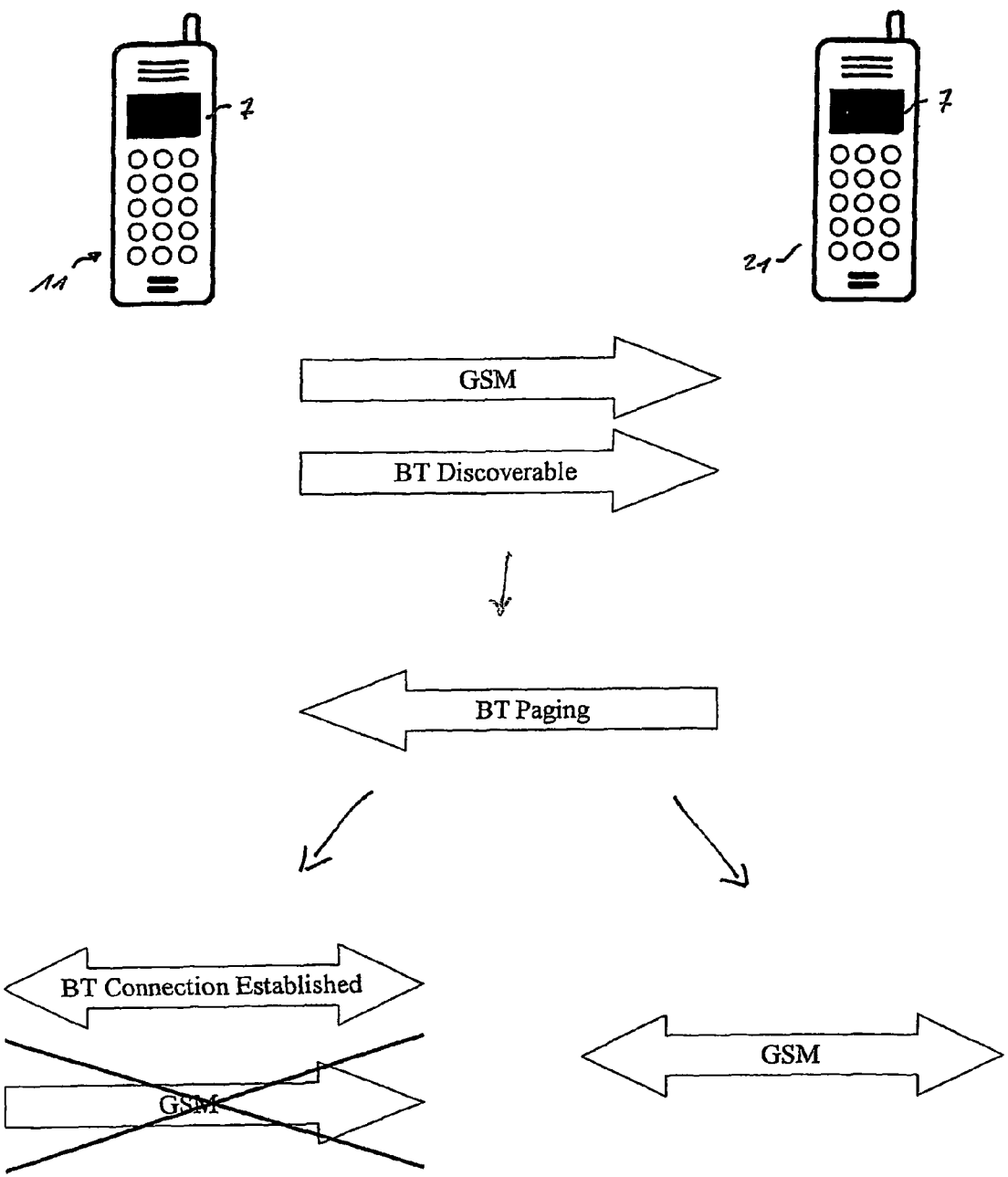
FIG. 2 shows a first embodiment of a method for establishing a communication link in accordance with the present invention.

FIG. 2 shows the steps of a first embodiment of a method in accordance with the present invention for establishing a communication link. In this embodiment, the first type of data communication refers to a communication via the GSM mobile network and the second type of data communication refers to bluetooth communication. However, it has to be noted that the present invention is not restricted to GSM and bluetooth communication. E.g. the first communication means could also communicate via an UMTS network or any other cellular network for mobile communications while the second type of data communication could be any kind of communication which provides a direct wireless link between two devices. Further, the two communication devices which are to be linked could be any kind of wireless communication devices.

In FIG. 2, a bluetooth link has to be established between the first mobile telephone 11 and the second mobile telephone 21 which might be within the bluetooth range of telephone 11. In this first embodiment of the present invention, both mobile telephones 11, 21 are so-called paired to each other since they frequently exchange communication data via a bluetooth link. As a result of the pairing process, identification information, i.e. device name, path key, the 48-bit bluetooth ID—of the respectively other communication device is stored in the memory 6b of each portable telephone 11, 21. Further, in the memory 6a the GSM number of the other portable telephone is stored wherein the GSM number and the bluetooth identification information form a pair.

At the beginning, the bluetooth interfaces of both telephones 11, 21 are deactivated. In order to establish the desired bluetooth link to the telephone 21, the user of the first telephone 11 in a first step dials the GSM number of the second telephone 21 in order to contact the other telephone 21 via the GSM network. At this moment, the controlling means 5 automatically activate the second communication means 4 and switch the bluetooth interface of telephone 11 in the Discoverable/Connectable mode. Telephone 11 is now able to establish a bluetooth link.

When the second telephone 21 gets the call from the GSM network, the controlling means 5 read the storing means 6 in order to check whether telephone 11 is a bluetooth partner, i.e. whether bluetooth identification information stored in memory 6b is associated to the GSM number of telephone 11. Since in the present example both memories 6a and 6b of telephone 21 contain identification information in regard to telephone 11, the controlling means of 5 of telephone 21 activate the communication means 4 for bluetooth communication and start a bluetooth connection by activating the paging mode in order to find the communication device which has the stored bluetooth identification number, i.e. in order to contact telephone 11 via bluetooth.

In case telephone 21 finds telephone 11 within its bluetooth range and can successfully establish a bluetooth link, the incoming GSM call from telephone 11 is automatically refused by telephone 21. As a result, both telephones 11 and 21 are only connected via the bluetooth link and can now work as two-way radios. On the displays 7 provided at each telephone 11, 21 it is indicated that the connection to the communication partner is being routed via bluetooth and is therefore completely for free.

In case telephone 21 is not able to contact telephone 11 via bluetooth, e.g. because the distance is too high, then the call between both telephones 11, 21 will be handled as a normal GSM call. Both telephones automatically switch off the bluetooth communication means 4 in order to save energy. Preferably, the shut down of the bluetooth interfaces takes place if a bluetooth link cannot be established within a certain period of time after telephone 11 contacts telephone 21 via the GSM call.

In some cases, there is a certain likelihood that the second communication device—here the telephone 21—is already in the Discoverable/Connectable mode. Then, the establishment of the desired bluetooth link can be accelerated in that the first telephone 11—simultaneously with transmitting the GSM call—tries to contact the second telephone via bluetooth. If the second telephone 21 is indeed already in the Discoverable/Connectable mode, the bluetooth link can be established right away without the need of first contacting the second telephone 21 via GSM. However, if the bluetooth communication means of telephone 21 are deactivated and the first telephone 11 is thus not able to contact the second telephone 21 via bluetooth, the link is established following the steps described above.

Figure 3:
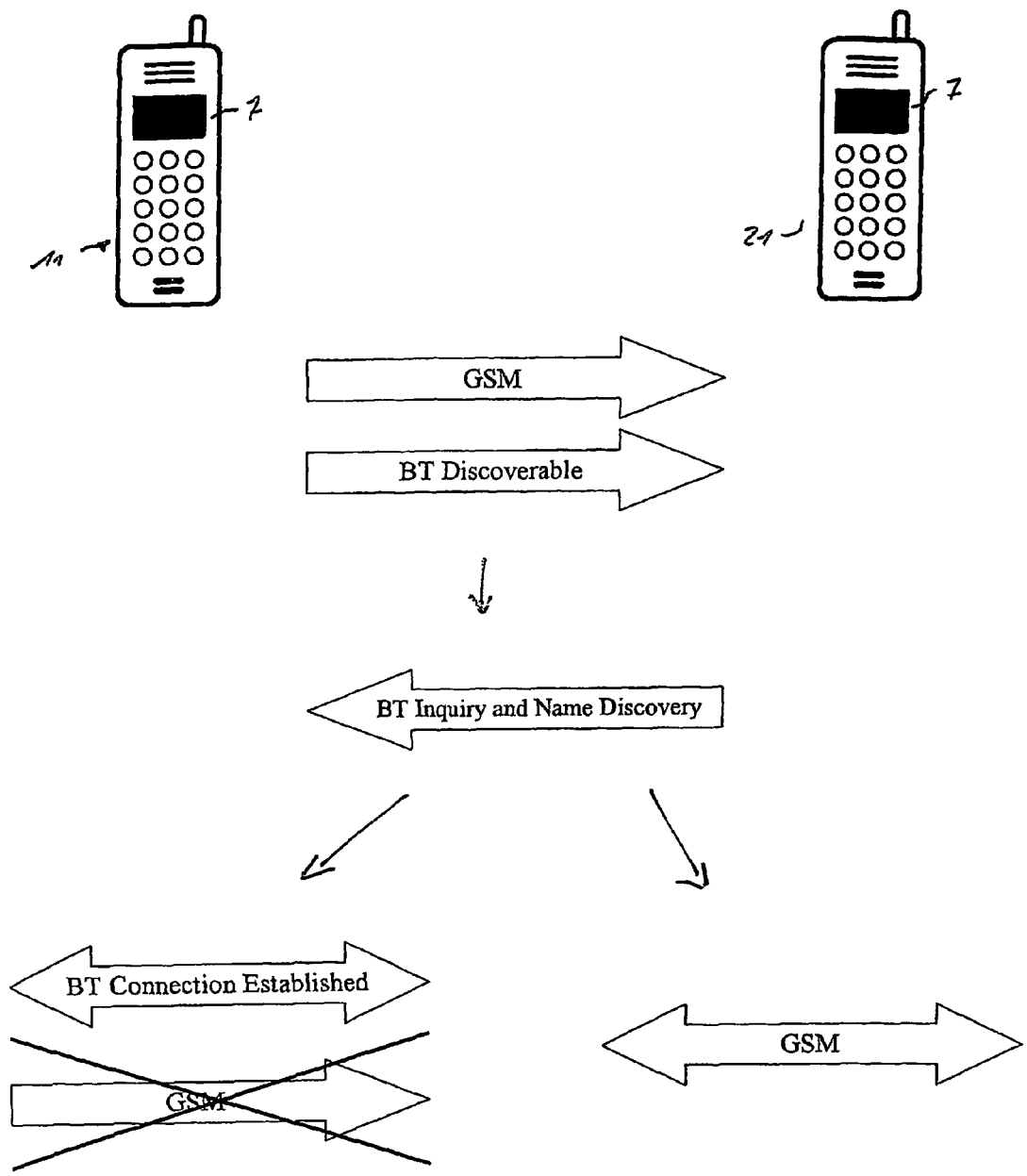
FIG. 3 shows a second embodiment of a method for establishing a communication link in accordance with the present invention.

FIG. 3 shows a variation of the procedure shown in FIG. 2. In this example, the telephones 11 and 21 are not paired with each other. Again, telephone 11 starts the communication via a GSM call in order to contact telephone 21 via the GSM network. Besides that, the bluetooth communication means 4 are automatically activated and put in the Discoverable/Connectable mode.

In order to allow telephone 21 to contact telephone 11 via a bluetooth link, identification information is transmitted from telephone 11 to telephone 21 via the GSM network. As an example, the six last digits of the bluetooth identification number could be transmitted via the GSM call.

After receipt of the GSM call, telephone 21 activates its bluetooth communication means and starts a so-called bluetooth inquiry and name discovery in order to find a bluetooth device in its range whose identification number corresponds to the received identification information.

In case telephone 21 finds telephone 11 and successfully establishes a bluetooth connection, the GSM call of telephone 11 is automatically refused by the controlling means of telephone 21. Again, both telephones 11 and 21 are only connected via the bluetooth link and work as two-way radios. In case a bluetooth link can not be successfully established, the call between both telephones 11 and 21 will be handled as a normal GSM call. The type of communication link which has been established is again shown on both displays 7.

In this second embodiment it is not necessary to pair both communication devices before establishing a bluetooth link. However, the inquiry and name discovery mode requires more time to contact the partner via bluetooth.

As can be seen from both examples, the bluetooth interfaces of both telephones 11, 21 are only activated at the time telephone 11 tries to contact telephone 21. Since the bluetooth link is triggered by the GSM network, the energy for the bluetooth communication means 4 is saved and the stand-by time of the telephones is significantly increased.

The invention claimed is:

1. A method for establishing a wireless audio communication link between two mobile communication terminals comprising:
emitting from a first mobile communication terminal a communication signal for contacting a second mobile communication terminal, the communication signal being of a first type of wireless data communication,
automatically activating in the first mobile communication terminal communication means which are configured to transmit and receive data according to a second type of data communication,
upon receipt of the communication signal of the first type of wireless data communication, activating in the second mobile communication terminal communication means which are configured to transmit and receive data according to the second type of data communication,
establishing the audio communication link only according to the second type of data communication between the communication means of the first and second mobile communication terminals when the audio communication link according to the second type of data communication is able to connect the first and second mobile communication terminals, wherein the first type of wireless data communication uses a cellular communication system and the second type of data communication is used for audio communication such that it allows a direct audio communication between the first and second mobile communication terminals, and
further comprising after the establishment of the audio communication link according to the second type of data communication, refusing the communication signal emitted from the first type of wireless data communication from the first mobile communications terminal by the second mobile communication terminal.

2. A method according to claim 1 further comprising establishing an audio communication link according to the first type of data communication if the audio communication link according to the second type of data communication is not successfully established within a first period of time.

3. A method according to claim 2, further comprising inactivating the communication means for the second type of data communication if the audio communication link according to the second type of data communication is not established within the first period of time.

4. A method according to claim 1, wherein at least the second mobile communication terminal comprises stored information for contacting the first mobile communication terminal with the second type of data communication.

5. A method according to claim 1, wherein the communication signal emitted by the first mobile communication terminal with the first type of data communication comprises identification information for contacting the first mobile communication terminal with the second type of data communication.

6. A method according to claim 1, further comprising simultaneously with transmitting the communication signal according to the first type of wireless data communication, contacting the second mobile communication terminal via the second type of data communication with the first mobile communication terminal.

7. A method according to claim 1, wherein the first and second mobile communication terminals are portable telephones.

8. A method according to claim 1, wherein the communication signal of the first type of wireless data communication is a GSM signal.

9. A method according to claim 1, wherein the audio communication link according to the second type of data communication is a bluetooth audio link.

10. A method according to claim 1, further comprising determining whether the first mobile communication terminal is included in a stored list of mobile communication terminals at the second mobile communication terminal, and activating in the second mobile communication terminal the means which are configured to transmit and receive data according to the second type of data communication when the first wireless mobile communication terminal is included in the stored list of mobile communication terminals at the second mobile communication terminal.

11. A method according to claim 1, further comprising displaying the audio communication link according to the first or second type of data communication which has been established on at least one of the first and second mobile communication terminals.

12. A method according to claim 1, further comprising when the audio communication link according to the second type of data communication is unable to connect the first and second mobile communication terminals, switching off the audio communication link according to the second type of data communication on the first and second mobile communication terminals.

13. A wireless mobile communication terminal comprising:
first communication means for emitting and receiving communication signals according to a first type of data communication and second communication means for emitting and receiving communication signals according to a second type of data communication,
wherein in order to establish an audio communication link only according to the second type of data communication with another wireless mobile communication terminal, the wireless mobile communication terminal further comprises controlling means which automatically activate the second communication means according to the second type of data communication when the audio communication link according to the second type of data communication is able to connect the wireless mobile communication terminal and the other wireless mobile communication terminal if a communication signal according to the first type of data communication is received by the wireless mobile communication terminal,
wherein the first type of wireless data communication uses a cellular communication system and the second type of data communication is such that it allows a direct audio communication between the wireless mobile communication terminal and the other wireless mobile communication terminal, and the wireless mobile communication terminal is configured to refuse the communication signal emitted from the first type of wireless data communication from the first mobile communications terminal by the second mobile communication terminal after the establishment of the audio communication link according to the second type of data communication.

14. A wireless mobile communication terminal according to claim 13, wherein the wireless mobile communication terminal is configured to inactivate the first communication means after the establishment of the audio communication link according to the second type of data communication with the other mobile communication terminal.

15. A wireless mobile communication terminal according to claim 14, wherein the controlling means are configured to automatically inactivate the second communication means if the audio communication link according to the second type of data communication is not established within a first period of time.

16. A wireless mobile communication terminal according to claim 14, further comprising storing means including identification information for contacting other mobile communication terminals with the second type of data communication.

17. A wireless mobile communication terminal according to claim 13, further comprising storing means including identification information for contacting the wireless mobile communication terminal by means of the second type of data communication wherein the identification information is transmitted via a communication signal according to the first type of data communication.

18. A wireless mobile communication terminal according to claim 13, wherein the wireless mobile communication terminal is a portable telephone.

19. A wireless mobile communication terminal according to claim 13, wherein the first type of data communication is a GSM signal.

20. A wireless mobile communication terminal according to claim 13, wherein the second type of data communication is a bluetooth audio link.

21. A wireless communication system comprising at least two wireless mobile communication terminals according to claim 13.

22. A wireless communication system according to claim 21, wherein an audio communication link according to the first type of data communication is established between the at least two wireless mobile communication terminals if the communication link according to the second type of data communication is not successfully established within a first period of time.

23. A wireless mobile communication terminal according to claim 13, wherein the wireless mobile terminal is further configured to determine whether the wireless mobile communication terminal is included in a stored list of mobile communication terminals at the other wireless mobile communication terminal, and to activate in the other wireless mobile communication terminal the means which are configured to transmit and receive data according to the second type of data communication when the wireless mobile communication terminal is included in the stored list of mobile communication terminals at the other wireless mobile communication terminal.

24. A wireless mobile communication terminal according to claim 13, wherein the terminal is configured to display the audio communication link according to the first or second type of data communication which has been established on at least one of the wireless mobile communication terminals.

25. A wireless mobile communication terminal according to claim 13, wherein the wireless mobile communication terminal is configured to switch off the audio communication link according to the second type of data communication on the wireless mobile communication terminals when the audio communication link according to the second type of data communication is unable to connect the wireless mobile terminals.

* * * * *